United States Patent [19]
Chang et al.

[11] Patent Number: 5,309,532
[45] Date of Patent: May 3, 1994

[54] ELECTRO-OPTIC INTENSITY MODULATOR WITH IMPROVED LINEARITY

[75] Inventors: William S. C. Chang, La Jolla; Mark L. Farwell, San Diego, both of Calif.

[73] Assignee: The Regents of the University of California, Oakland, Calif.

[21] Appl. No.: 970,064

[22] Filed: Nov. 2, 1992

Related U.S. Application Data

[63] Continuation-in-part of Ser. No. 801,940, Dec. 2, 1991, Pat. No. 5,230,028.

[51] Int. Cl.$^5$ ............................................. G02B 6/10
[52] U.S. Cl. ............................................. 385/3; 385/4
[58] Field of Search .............................. 385/1-3, 385/40, 41, 14

[56] References Cited

U.S. PATENT DOCUMENTS

| | | | |
|---|---|---|---|
| 4,859,876 | 8/1989 | Dirk et al. | 385/8 |
| 4,932,738 | 6/1990 | Haas et al. | 385/2 |
| 4,936,645 | 6/1990 | Yoon et al. | 385/132 |
| 5,002,353 | 3/1991 | Johnson | 385/3 |
| 5,011,264 | 4/1991 | Bradley et al. | 385/2 |
| 5,015,053 | 5/1991 | Johnson | 385/2 |

OTHER PUBLICATIONS

"Waveguide Modulators with Extended Linear Dynamic Range-A Theoretical Prediction", Zong-Qi Lin and William S. C. Chang, IEEE Photonics Tech. Lett., vol. 2, No. 12, Dec. 1990.

"An Electrooptic Intensity Modulator with Improved Linearity", Farwell, et al., IEEE Photonics Tech. Lett., vol. 3, No. 9, Sep. 1991.

"Intermodulation Distortion in a Directly Modulated Semiconductor Injection Laser", Lau, K. Y. et al., *Appl. Phys. Lett* 45(*10*), Nov. 15, 1984, pp. 1034–1036.

"In Search of a Linear Electrooptic Amplitude Modulator", Liu, Pao-Lo et al., *IEEE Photonics Tech. Lett.*, vol. 3, No. 2, Feb. 1991, pp. 144–146.

*Primary Examiner*—Frank Gonzalez
*Attorney, Agent, or Firm*—Brown, Martin, Haller & McClain

[57] ABSTRACT

The improved intensity modulator comprises a directional coupler with a single active coupling section with a fixed amount of coupling along with a single pair of electrodes for supplying a voltage-controlled mismatch in propagation constants. Two passively-biased coupling sections are connected in series with the active section, with the two passive sections combined being at least one coupling length long. The bias voltage of the two passive sections are independently varied to compensate for non-linearities by providing additional coupling. In addition to a DC bias voltage, the active coupling section is supplied with an RF signal which may propagate from its input end to its output, along with the optical signal, if a traveling wave electrode is used. Alternate embodiments provide temperature-induced drift compensation and reduction of chirping.

17 Claims, 3 Drawing Sheets

ELECTRO-OPTIC INTENSITY MODULATOR WITH IMPROVED LINEARITY

CROSS-REFERENCES TO RELATED APPLICATIONS

This is a continuation-in-part of application Ser. No. 07/801,940, filed Dec. 2, 1992, and now U.S. Pat. No. 5,230,028, issued Jul. 20, 1993.

BACKGROUND OF THE INVENTION

Electro-optic communication systems historically have been more suited to digital modulation than analog modulation. This is due in part to the tradeoff between bandwidth and signal-to-noise ratio in optical systems. However, digital encoding is not always practical for conversion of signals with a large number of channels, such as video signals, primarily for economic reasons. By eliminating the need for encoding and decoding, the complexity and cost of analog communication systems can be greatly reduced.

The most obvious analog modulation scheme for optical communication systems is direct laser modulation. An obstacle to the success of such a system is the nonlinear relationship of the intrinsic input current to the output intensity of typical light-emitting devices. Distortion of the signal caused by non-linearities can be a problem, particularly in multi-channel systems where a high degree of linearity is required to prevent inter-channel crosstalk.

External modulation of CW lasers may be more attractive than direct modulation since, without modulation of input current, such lasers possess spectral stability and low relative intensity noise (RIN). External modulation does not rely on the laser input current to output intensity characteristics, but relies on the input-to-output characteristics of the modulator itself. Thus, linear electro-optical waveguide modulators are extremely important for analog optical fiber communication and signal processing applications.

Well known external modulators do not provide an absolute solution, however, since existing modulators possess their own nonlinear characteristics, thus limiting their linear dynamic range in their application in critical areas, such as radar and CATV. Such modulators include Mach-Zehnder interferometers, directional couplers and absorption modulators. A few techniques for enhancing the linearity of external modulators have been reported. Typically, the nonlinear responses of two modulators are combined in parallel, with the nonlinear response of one used to cancel that of the other. Some improvement in linearity has been demonstrated with parallel combination of Mach-Zehnder modulators and with polarization mixing. These parallel schemes, however, not only require precise control over the parameters in one modulator but also simultaneous relative control over the same parameters between the two parallel components. Hence, the controllability and fabrication tolerance requirements of these designs may be difficult to meet.

Designs have been proposed that combine the nonlinear responses of modulators in series. Feeding the output from a Mach-Zehnder into a synchronously-modulated directional coupler has been proposed by Liu et al., "In Search of a Linear Electro-optic Amplitude Modulator", *IEEE Photon. Technol. Lett.*, Vol. 3, pp. 144–146, February, 1991. While such a system provides extended linearity, simultaneous control is still an issue. Further, serial combination of active modulators may limit the bandwidth of the desired linear response.

SUMMARY OF THE INVENTION

An advantage of the optical intensity modulator of the present invention is that it provides substantial improvement in linearity with simplicity and reasonable tolerances.

Another advantage of the present invention is that simultaneous control of active coupling sections is not required.

Still another advantage of the present invention is that the bandwidth of the active section is extremely large.

Yet another advantage of the present invention is to provide a directional coupler which requires fabrication of only one coupled waveguide structure.

In an exemplary embodiment, the improved intensity modulator comprises a directional coupler with a single active coupling section with a fixed amount of coupling along with a single pair of electrodes for supplying a voltage-controlled mismatch in propagation constants between the two channels which feed the coupler. Two passively-biased coupling sections are connected in series with the active section, with the two passive sections combined being at least one coupling length long. The bias voltage of the two passive sections are independently varied to compensate for non-linearities by providing additional coupling. The directional coupler is created by fabricating a single coupled waveguide structure (at least two coupling lengths long), then defining three separate electrode sections thereon.

In a second embodiment, a voltage-controlled directional coupler is connected in series with a fixed Mach-Zehnder modulator and a fixed directional coupler, and linearity is obtained by varying the phase shift of the Mach-Zehnder modulator, the length of the fixed directional coupler, and the length and coupling coefficient of the active coupler.

In a third embodiment, the directional coupler or the Mach-Zehnder modulator is operated at a low DC bias optical modulation depth (OMD), contrary to the conventional mode of operating at 50% bias optical modulation depth. In this embodiment, third order nonlinearities are minimized. This embodiment can also be combined with the first embodiment or the second embodiment.

In all embodiments, fabrication and operational tolerances are relaxed relative to parallel schemes because simultaneous control of active sections is not required.

The active coupling section is subject to the effects of the transit time of an optical wavefront as it travels through the coupler. The transit time affects the phase and the amplitude of the modulation of the optical wave at the end of the active section, severely limiting the bandwidth over which significant improvement of all orders of nonlinearity can be obtained. To reduce this effect, a traveling wave electrode is used for the active section. In the traveling wave electrode, the RF signal propagates from the input end to the output end along with the optical wavefront. Thus, the optical wavefront sees a constant RF voltage when the velocities of the RF and the optical waves are perfectly matched.

In a fourth embodiment, an additional way to improve the usable bandwidth is provided for applications in which the second harmonic spurious signal can be filtered out electrically in the receiver circuit (e.g. single octave bandwidth applications). This improvement is achieved by adjusting the DC bias voltage of the active section and varying the bias voltages of the passive feedforward sections to minimize the third order intermodulation spurious signal, while the second harmonic spurious signal is allowed to increase in the modulator. This improvement method will be effective whether or not the traveling wave electrode is used. The traveling wave electrode is still needed for high frequency or very large bandwidth operations.

In a fifth embodiment, the temperature-induced drift in device performance is compensated for by monitoring device performance and adjusting feed forward voltages. A continuous wave (CW) monitor signal is added to the active section at a frequency that will not interfere with the signal propagating through the coupler which permits monitoring of third order intermodulation to detect drift. The detector provides a correction to the passive sections to adjust the feed forward voltage.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
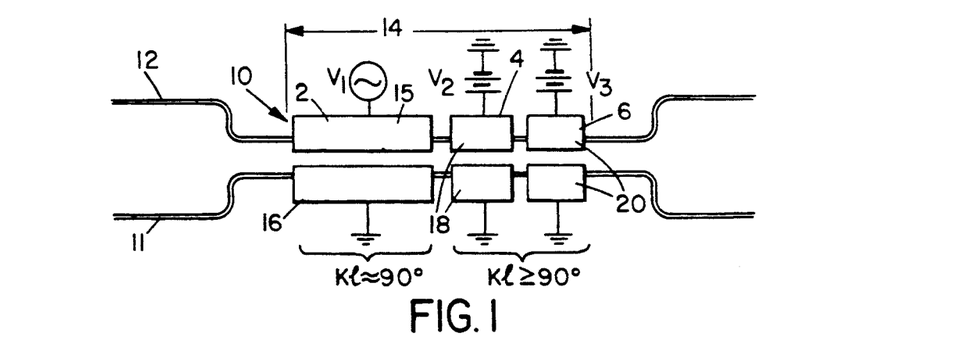
FIG. 1 is a block diagram of an intensity modulator with improved linearity according to the present invention.

As illustrated in FIG. 1, the waveguide modulator consists of an active section 2 and two passive sections 4 and 6. Directional coupler 10 has first channel 11 and second channel 12, the space between which is narrowed, as is known in the art, for a predetermined length 14 to permit transfer of optical energy between the channels. Length 14 is divided to form sections 2, 4 and 6 by defining a pair of electrodes corresponding to each section. The electrode pair 15, 16 provides means for supplying a voltage-controlled mismatch in propagation constants between the two channels 11 and 12. Electrode pairs 18 and 20 define sections 4 and 6, respectively, and provide means by which passive biases can be applied to these sections. In order to obtain optimal nonlinear compensation, the lengths of electrode pairs 18 and 20 should, together, be equal or greater than the length of electrode pair 15, 16. The total length 14 should be sufficient to provide a complete transfer of optical energy at least two times. In actual operation, there is a DC bias voltage in addition to the higher frequency signal voltage contained in the $V_1$ applied to the electrode pair 15 and 16. The DC bias portion of $V_1$ is usually set to provide approximately equal intensity in channels 11 and 12 at the end of section 2 at zero signal voltage, i.e. 50% optical bias. This bias setting is necessary primarily to keep the second harmonic spurious signal to the minimum at the output of the coupler. $V_2$ and $V_3$ are adjusted primarily to minimize the third order intermodulation nonlinear spurious signal.

Figure 2:
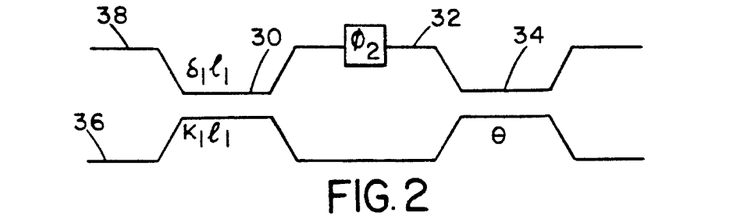
FIG. 2 is a block diagram of an alternate embodiment of the intensity modulator with improved linearity.

In the second embodiment illustrated in FIG. 2, voltage-controlled directional coupler 30 is connected in series with a fixed Mach-Zehnder interferometer 32 with phase shift $\phi_2$ and a fixed directional coupler 34. The modulation is introduced into first channel 36. Second channel 38 is used to introduce an appropriate feedback so that the modulated power output from the first channel 36 has more linear dependence on the applied modulation voltage V. The method for determining the values of phase mismatch introduced by directional coupler 30 and the phase shift by Mach-Zehnder interferometer 32 is described below.

In the low frequency linearized modulator, the electrode pair 15, 16 appears electrically as a lumped capacitor in parallel with a lumped resistor. The electrode pair 15, 16 is typically connected electrically to the RF driver through the middle of each electrode. The phase and the magnitude of the voltage, i.e., the RF electric field, are uniform across the entire electrode at any given time. The phase and magnitude of the voltage change as a function of time. However, as an optical wavefront enters into the active section 2 of the modulator, it takes a finite amount of time ("transit time") to propagate to the end of the active electrode. At a particular instant in time, the phase of the RF field at the end of the electrode has already changed. The amount of the phase change depends on the length of the transit time which, in turn, depends on the length of the electrode and the optical velocity. The transit time will affect the phase and the amplitude of the modulation of the optical wave at the end of the active section.

In a conventional use of a directional coupler intensity modulator without any consideration of the level of spurious nonlinearity signals, only the amplitude of the modulation of the optical wave (i.e. the signal at the fundamental frequency) is of concern. Thus, the effect of transit time for a reasonable length electrode is negligible until the frequency has reached 5 to 6 GHz or more. The conventional wisdom would ignore the transit time effect for frequencies less than 1 GHz. On the other hand, the feed forward action of the passive electrodes 4 and 6 is clearly dependent on both the phase and the amplitude of the modulation of the optical wave which occur in the active section 2. At a given set of DC feed forward voltages, the bandwidth within which linearization can be held within a specific limit may be much narrower than the bandwidth of a conventional modulator.

In order to reduce the effect of transit time in high frequency or large bandwidth applications, a traveling wave electrode is used for the active section. In a traveling wave modulator, the RF signal propagates from the input end of the electrode to the output end as does the optical wave. If the RF velocity is equal to the optical velocity, the optical wavefront will see a constant RF voltage, as in the DC case. With the matched RF and optical velocities, there will be no bandwidth limitation due to the transit time. While this is the first time that the effect of transit time on the feed forward interaction of a linearized directional coupler modulator has been recognized, traveling wave electrodes have been investigated for some time. In actuality, there may not be a perfect match between the phase velocity of the RF signal and the optical wave. Thus, there may be some bandwidth limitation in linearizing the directional coupler due to the transit time, even when using traveling wave electrodes.

For cable TV applications, low nonlinear spurious signals over a wide frequency band, such as from 50 MHz to 300 MHz for the lower band, and/or from 350 MHz to 500 MHz for the upper band, are needed. The reduction of nonlinear spurious signals over such a wide band for fixed DC voltages applied to the two feed forward electrodes requires much smaller transit time effect than other narrower band applications. Thus, the importance of traveling wave electrodes will vary depending upon the application.

For applications that require only less than one octave of bandwidth, e.g. the upper 40 channel band for cable TV, only the third order intermodulation nonlinear spurious signal will affect the dynamic range of the communication system. The second order harmonic nonlinear spurious signal can be filtered out electrically at the receiver. In this case, the DC bias voltage in $V_1$ can be adjusted to a bias operating point with much lower bias OMD in channel 11. Using simultaneous adjustment of $V_1$, $V_2$ and $V_3$, a very low third order intermodulation nonlinear spurious signal can be obtained over a much broader bandwidth for both the lumped capacitor electrode and the traveling wave electrode without a perfect match of the phase velocities of the r.f. signal and the optical wave. The second order spurious signal will increase dramatically, but it will be filtered out electrically. This method would allow use of the much simpler lumped capacitor electrode for modulation frequencies up to 2 or 3 Ghz, and it would relax the stringent phase matching conditions of the traveling wave electrode at higher frequencies. Adjustment of the modulator to the low bias point with low output in channel 11 alone will significantly reduce the effect of the third order intermodulation spurious signal on the dynamic range of the communication system, although it is not as effective as simultaneous adjustment of all bias voltages. This technique is important for applications using other existing modulators such as the Mach-Zehnder.

It is well known that optical devices in general may be subject to slow drifts in device performance as the temperature of the environment changes. The directional coupler of the present invention may also exhibit such drift. However, it is difficult to determine what the causes of the slow drift are.

The conventional method to compensate for slow drift is to use a temperature sensor and temperature controller to stabilize the temperature. While this may be necessary for large temperature fluctuations, in the present invention compensation may be applied by monitoring the device performance and adjusting the feed forward voltages, rather than eliminating the drift.

In one embodiment of the compensation method, an additional single-tone or double-tone continuous wave monitoring signal is introduced into the active electrode at a frequency such that it will not interfere with the operation of the device for its specific application. The harmonic and/or third order intermodulation spurious signal of this monitoring signal may be used to monitor any drift in the linearization process. An electronic feedback circuit will then change the feed forward voltage and the DC bias voltage of $V_1$ slightly until the spurious signal is minimized.

This method provides a number of advantages over the conventional means for compensation. It is more sensitive than conventional temperature control and it monitors the linearization process directly. It will also compensate for non-temperature related drift introduced by other mechanisms. This method may also be used in conjunction with a less accurate temperature controller to provide precise control over temperature-induced drift.

Figure 7:
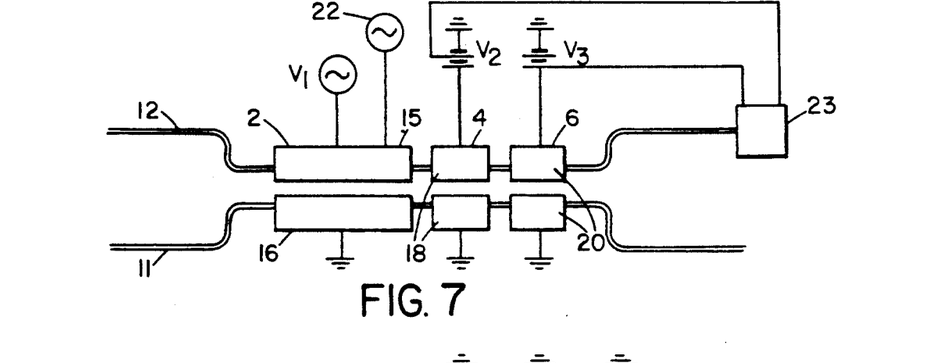
FIG. 7 is a block diagram of an embodiment of the intensity modulator including a monitoring system for detecting and correcting drift.

In FIG. 7, for drift compensation, signal generator 22 provides an additional monitoring signal to the active electrode, where the monitoring signal is of a frequency which will not interfere with the carrier or modulation signals. The detection of harmonic and/or third order intermodulation spurious signals at detector 23 is indicative of temperature-induced drift. A signal provided by detector 23 is used to slightly change $V_2$ and/or $V_3$ as well as the DC bias voltage of $V_1$ to minimize the spurious signal.

Although the phase variation of the optical wave which is produced by the time variation of the input electrical voltage does not affect the intensity modulation at the output of the entire linearized modulator, the phase variation as a function of time results in a frequency variation in the optical wave. This phenomenon is called "frequency chirping". In fiber-optic communication systems that employ closely-spaced frequency channels, minimizing chirping is a major concern. In a conventional directional coupler modulator without feed forward electrodes, the chirping in the through channel is zero. However, there is a small amount of chirping in the linearized directional coupler. In the present invention, the effect of feed forward is expressed mathematically by a 2×2 matrix. This matrix has three parameters, i.e., matrix elements, that can be varied. Only two parameters are needed to compensate nonlinear distortion. Therefore, the variation of the third parameter, e.g., by means of a third feed forward electrode, may be used to reduce chirping.

Figure 8:
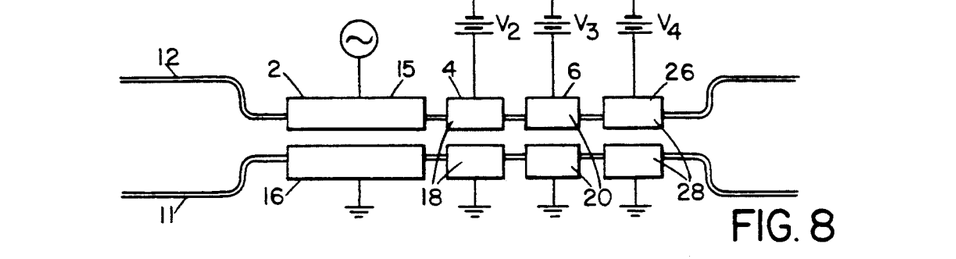
FIG. 8 is a block diagram of a fourth embodiment of the invention including an additional passive section for reducing chirping.

In FIG. 8, a third passive section 26 with feed forward electrode 28 where voltage $V_1$ is varied to reduce chirping which is detected at the output of the modulator.

The following explanation and mathematical analyses provide a means by which the parameters are selected for all embodiments.

A conventional directional coupler consists of a single coupling section with a fixed amount of coupling ($\kappa l = 90°$, where $\kappa$ is the coupling coefficient and $l$ is the length of the coupler) along with a single pair of electrodes which supply a voltage-controlled mismatch in propagation constants between the two channels ($\delta l = (\Delta\beta/2)l$, where $\beta$ is the propagation constant).

Looking at the example of a typical analog link consisting of a CW laser, a perfectly-linear modulator, a transmission link and a linear detector followed by a linear amplifier and bandpass filter, the electrical dynamic range of such a system is given by:

$$DR = 20 \log \left[ \frac{\overline{(i_s)}}{\overline{(i_n)}} \right] \quad (1)$$

where $\bar{i}_s$ and $\bar{i}_n$ are the equivalent signal and noise current, respectively, at the output of the receiver including the detector, the filter and the amplifier. The $\bar{i}_s$ will be proportional to the modulated optical power, the transmission of the optical link and the receiver response. The modulated optical power, i.e., the optical signal power, is the product of the optical carrier power $I_O$ and the modulator transfer function $T(V)$ where V is the applied electrical modulation voltage. The receiver is assumed to be linear. For a well designed receiver, its receiver noise should be shot noise limited. Therefore $\bar{i}_n$ is proportional to the square root of the product of $I_O$, the transmission of the optical link, the receiver response and T at the bias point. For such a receiver and a perfectly-linear modulator, both the $I_O$ and the modulation index m, i.e., the $\bar{i}_s$, can be made arbitrarily large in order to obtain a very large DR. However, for practical modulators, T is not a linear function of V. There will be a limitation of the DR given by 20l og (optical signal power/spurious signal power). The maximum linear DR of the system is obtained when the spurious signal power due to nonlinear distortion is equal to the equivalent noise power.

Figure 3:
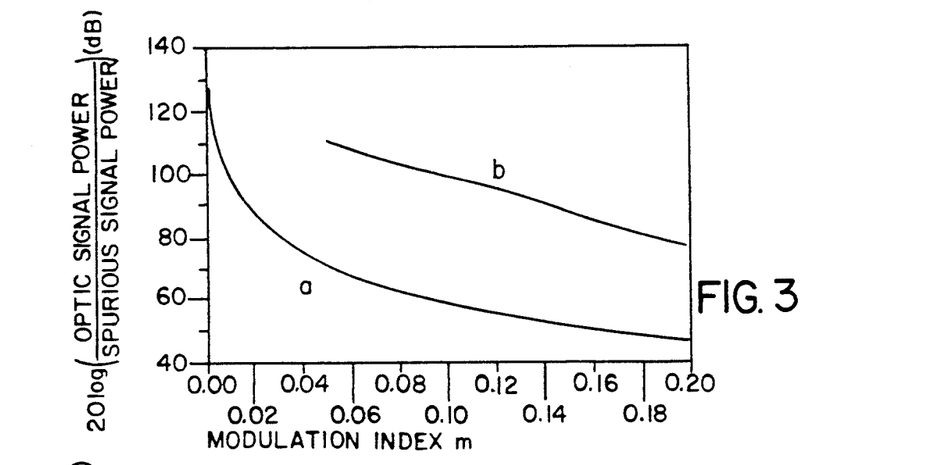
FIG. 3 is a plot of the ratio of optical signal power to spurious signal power versus modulation index.

Using the discrete two-tone test, as is known in the art (see, e.g., K. Y. Lau et al., "Intermodulation Distortion in a Directly Modulated Semiconductor Injection Laser", *Appl. Phys. Lett.*, Vol. 45, No. 10, pp. 1034–1036, 1984), the nonlinear distortion of an external modulator can be evaluated. For typical modulators, such as the Mach-Zehnder biased at 50% OMD, the output intensity has a sinusoidal dependence on the applied voltage so that:

$$I = I_0 T(V) = I_0 [1 + \sin KV] = \quad (2)$$
$$I_0 [1 + \sin)m \cos\omega_1 t + m \cos\omega_2 t)]$$

for the standard two-tone test input where V is the instantaneous applied voltage, K is a proportionality constant, and m is the modulation index. The third order inter-modulation terms at $2\omega_1 - \omega_1$ and $2\omega_1 - \omega_2$ frequencies constitute the spurious signal power. The ratio of the optical signal power to the spurious signal power is $8/m^2$, as shown by curve a in FIG. 3. For conventional directional coupler devices, the ratio of optical signal power to the spurious signal power has a similar value.

From above, the ratio of optical signal power to spurious signal power due to third order intermodulation can be increased by reducing m. For example, at m=0.007, this ratio is 104 dB for devices such as the Mach-Zehnder modulator. However, in order to realize the 104 dB linear dynamic range, $I_O$ must be increased so that the $\bar{i}_s/\bar{i}_n$ ratio will be sufficiently large. A reduction of m by n times implies an increase of $I_O$ by $n^2$ times, assuming the receiver is dominated by shot noise. $I_O$ is usually limited in practice by either the laser power or the saturation intensity of the modulator. Thus, reduction of nonlinear distortion of T(V) is important so that a larger m, or a smaller $I_O$, can be used to achieve the desired linear dynamic range.

Compensation for non-linearities can be achieved by equivalent feed forward interaction using either two passively-biased coupling sections, as shown in FIG. 1, or a fixed phase shifter plus fixed coupler, as shown in FIG. 2.

Figure 4:
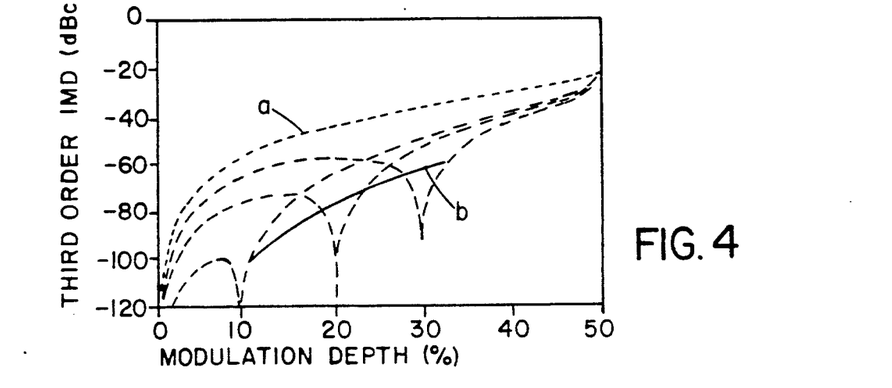
FIG. 4 is a plot of the spurious signal power (third order IMD) versus modulation depth.

In the first embodiment, calculations for low frequency operation or for the traveling-wave electrode at high frequency with perfect phase mismatch show that if the two passive sections 4 and 6 are at least one coupling length long, i.e., $\kappa_2 l_2 \geq \kappa_1 l_1$, optimal nonlinear compensation is possible at any modulation depth, regardless of the exact coupling length of the actively-modulated directional coupler section 2. Using a computer simulation, third order inter-modulation distortion (IMD) levels can be plotted as a function of modulation depth. The computer program time-samples the theoretical response to a two-tone signal and uses the fast Fourier transform (FFT) to obtain a theoretical output spectrum. This approach allows for calculation of spurious signals at the necessary low levels and, in addition, includes contributions from all orders of non-linearities. FIG. 4 illustrates the spurious signal versus modulation depth for $\kappa l_1 = 2\kappa l_3 = 110°$ and for $\delta 1$ (active bias), $\delta l_2$ and $\delta l_3$, optimized to eliminate the third order IMD at the modulation depths of 9, 20 and 30%. Active coupling lengths from 80° to 140° provide similar results. For comparison, curve (a) in FIG. 4 gives a similar plot of an optimally biased conventional directional coupler (or Mach-Zehnder). Curve (b) gives the minimized largest third order IMD level. Comparison with a conventional directional coupler (or Mach-Zehnder) curve (a) yields the expected third order IMD suppression of the compensated directional coupler.

The waveguide modulator illustrated in FIG. 1 is fabricated by using commercially-available directional coupler waveguide structures. The waveguides used in development of the present invention were fabricated on z-cut $LiNbO_3$ with titanium indiffusion and were slightly over two coupling lengths long. An $SiO_2$ buffer layer was deposited on the waveguide structures and three electrode pairs were fabricated using aluminum evaporation, with the pairs corresponding to the active section and two passive sections. The lengths of the electrode pairs were selected so that $l_2$ of section 4 equals $l_3$ of section 6 equals $\frac{1}{2} l$ of section 2, so that both the active section and the combined passive sections would be at least one coupling length long.

Figure 5:
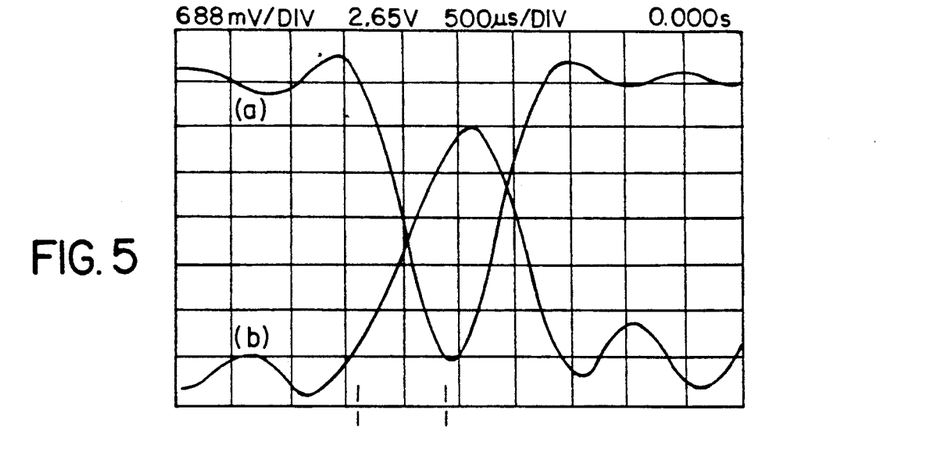
FIG. 5 is an exemplary oscilloscope trace of intensity versus voltage.

For testing purposes, a diode-pumped YLF laser operating at 1.31 micron, input and output polarization maintaining fibers and an InGaAs detector were connected with the waveguide modulator. Operation of a conventional directional coupler could be simulated by setting the bias voltages $V_2$ and $V_3$ for sections 4 and 6, respectively, to a sufficiently high voltage to decouple the channels below the passive electrodes. In this case, 33 V was used. Curve a in FIG. 5 was an exemplary oscilloscope trace for this condition. When $V_2$ and $V_3$ are reduced, additional coupling is introduced between the channels under the passive electrodes. The additional coupling inverts the oscilloscope trace (curve b) and allows tuning of the passive voltages to provide additional coupling response. Curve b shows the trace when passive voltages were tuned to produce the optimal linearized response shape, i.e., $V_2 = 1.15$ V and $V_3 = -3.85$ V.

In the second embodiment illustrated in FIG. 2, the amount of phase shift $\phi_2$ which is to be introduced by the Mach-Zehnder interferometer may be determined as follows:

The transfer-matrix M of the entire modulator illustrated in FIG. 2 is:

$$[M] = \begin{bmatrix} \cos\theta & -j\sin\theta \\ -j\sin\theta & \cos\theta \end{bmatrix} \begin{bmatrix} e^{j(\Phi 2/2)} & 0 \\ 0 & e^{-j(\Phi 2/2)} \end{bmatrix} \begin{bmatrix} A & -jB \\ -jB & A^* \end{bmatrix} \quad (3)$$

where:

$$A = \cos\sqrt{(\kappa_1 l_1)^2 + (\delta_1 l_1)^2} + j\left(\frac{\delta_1}{\sqrt{\kappa_1^2 + \delta_1^2}}\right) \cdot \sin\sqrt{(\kappa_1 l_1)^2 + (\delta_1 l_1)^2} ; \quad (4)$$

$$B = \left(\frac{\kappa_1}{\sqrt{\kappa_1^2 + \delta_1^2}}\right) \cdot \sin\sqrt{(\kappa_1 l_1)^2 + (\delta_1 l_1)^2} ;$$

$\theta = \kappa_2 l_2$; and $\kappa_1$ is the coupling coefficient of coupler 30;
$\delta_1$ is the difference in propagation wave number of the two-channel waveguide modes for coupler 30;
$l_1$ is the length of coupler 30;
$\kappa_2$ is the coupling coefficient of coupler 34;
$l_2$ is the length of coupler 34; and
$\delta_2 = 0$.

The complex amplitude of the guided wave modes at the output $\phi_{o1}$ and $\phi_{o2}$ are related to the complex amplitude of the guided wave modes as the input $\phi_{i1}$ and $\phi_{i2}$ by M.

$$\begin{bmatrix} \phi_{o1} \\ \phi_{o2} \end{bmatrix} = \begin{bmatrix} M_{11} & M_{12} \\ M_{21} & M_{22} \end{bmatrix} \begin{bmatrix} \phi_{i1} \\ \phi_{i2} \end{bmatrix} \quad (5)$$

For a modulator, $\phi_{i2}=0$ and $\phi_{o1}=M_{11} \omega_{i1}$, so $T=M_{11}^2$. In this device, only the phase mismatch $\delta_1 l_1$ the first coupler 30 is controlled by the applied RF voltage.

The parameters $\kappa_1 l_1$, $\theta$ and $\phi_2$ can be varied to minimize the nonlinear distortions. For any specific value of $\kappa_1 l_1$, there is a pair of the phase shift $\phi_2$ and the $\theta$ values that will minimize the third order intermodulation spurious signal.

In order to provide a simple way to understand the device, the nonlinear distortion at low frequencies, or at high frequencies with perfect match between optical and RF phase velocities, can be calculated by:

$$F(V) = T(V) - (1 + k'V) \quad (6)$$

Figure 6:
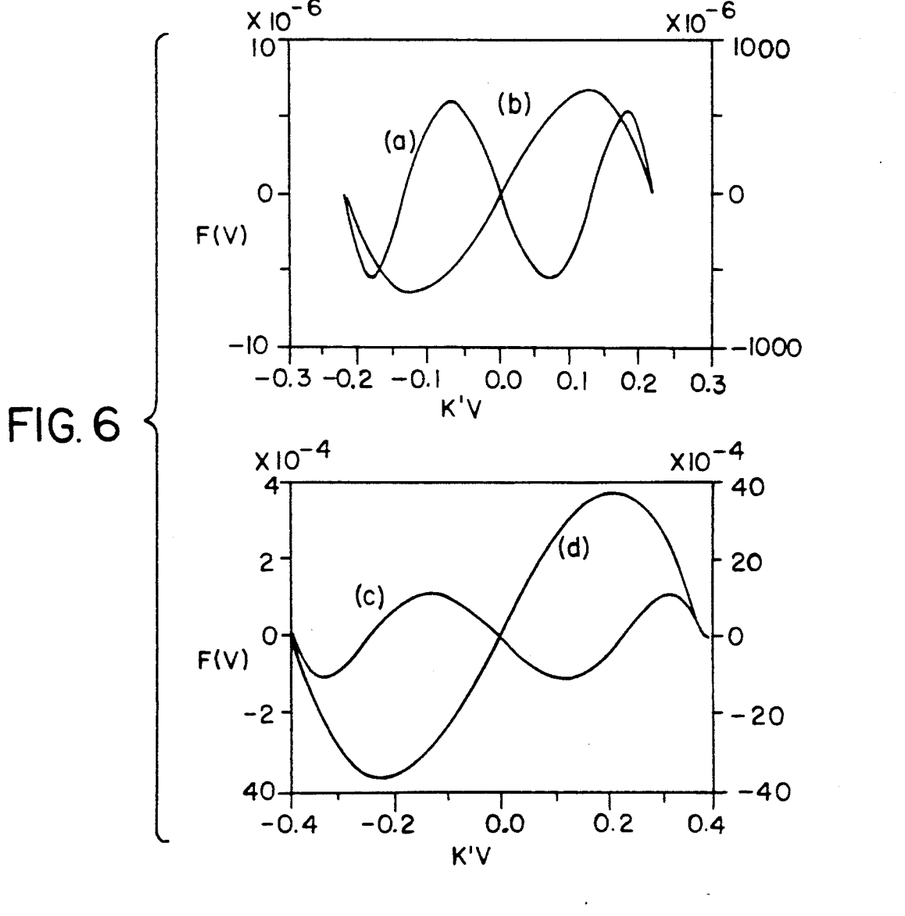
FIG. 6 is a plot of nonlinear distortion for a standard Mach-Zehnder interferometer and the modified directional coupler of FIG. 2.

For each individual choice of the modulation index m, K'V is varied from zero to $\pm 2$ m, and K' is chosen such that $F(V)=0$ when $K'V=\pm 2$ m. The K'V term is approximately equal to the normalized optical signal power at $I_O=1$. This is chosen primarily for mathematical convenience so that a large linear term and the DC term are subtracted from T(V). When the nonlinear distortion of the device is small, F(V) will have a small maximum deviation from the linear term. FIG. 6 shows the calculated F(V) as a function of K'V as follows.

Curve a shows the modified directional coupler with $M=0.11$, $\kappa_1 l_1 = 115°$, $\theta = 25°$ and $\phi_2 = 143°$; curve b for the Mach-Zehnder modulator with $M=0.11$; curve c is for the modified directional coupler with $M=0.195$, $\kappa_1 l_1 = 115°$, $\theta = 25.2°$, and $\phi_2 = 142.4°$; and curve d shows the Mach-Zehnder modulator with $M=0.195$. For the modified directional coupler, $\kappa_1 l_1$, $\phi_2$ and $\theta$ are values chosen to minimize the peak F value from which the spurious signals are calculated. The $2\omega_1-\omega_2$ and the $2\omega_2-\omega_1$ frequency terms of F are calculated by two methods. The first method is to calculate the spectral terms by fast Fourier transform from the time varying output. In the second method, sinusoidal functions have been used to approximate F. The spurious power at $2\omega_1-\omega_2$ and $2\omega_2-\omega_1$ can be obtained explicitly from this approximate function of F. Generally, the results from each of the two methods agree well with each other. Referring back to FIG. 3, curve b shows the achievable ratio of optical signal power to spurious signal power for the modified directional coupler as a function of m. An improvement on the order of 30 to 40 dB has been obtained as compared with the response of a Mach-Zehnder interferometer.

Figure 9A:
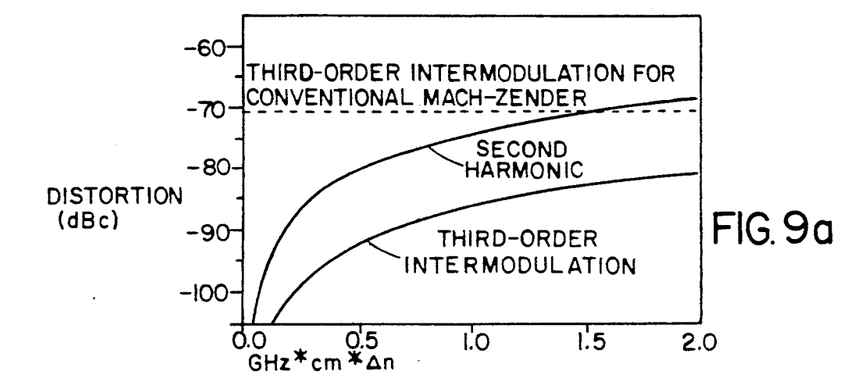
FIG. 9a is a plot of the theoretically calculated distortion in dBc for the two tone response at 50% DC optical bias and 5% RF OMD as a function of the operating frequency, the length of the active electrode, and the difference of the effective index of the optical wave and the RF wave.
Figure 9B:
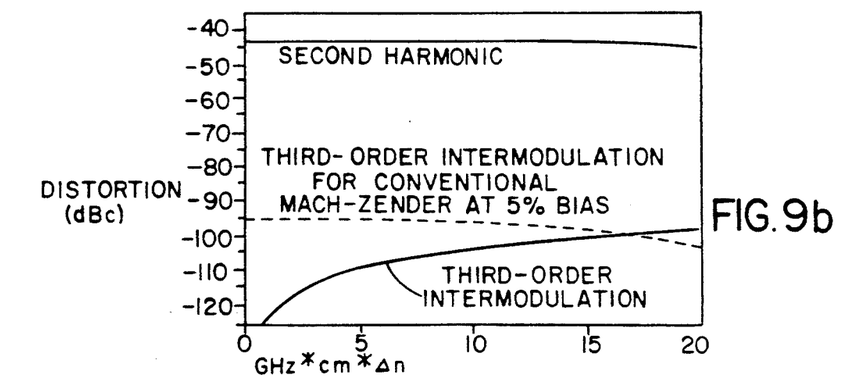
FIG. 9b is the same plot as in FIG. 9a when the DC optical bias is 5%.

For high frequency operation of either the lumped capacitance electrode, or the traveling wave electrode with imperfect match between the RF and the optical phase velocities, a computer simulation program is developed to calculate the fundamental and spurious signal levels as a function of modulation depth and frequency. This program takes into account the transit time effect and the nonlinear behavior of the device. FIG. 9 shows the theoretical predicted second order and third order intermodulation distortion in dBc for the two tone response as a function of the product of three quantities—the operating frequency in GHz, the length of the active electrode and the absolute difference of the effective index of the optical wave n° and the RF wave $n^m$, designated as $\Delta n$. The length of the electrode is typically of the order of one centimeter. The n° for LiNbO$_3$ devices is 2.2. The $n^m$ for lumped capacitance electrode is zero, while the $n^m$ for traveling wave electrode on LiNbO$_3$ varies from 2.2-3.2. The solid curves in FIG. 9a show the second harmonic and the third order intermodulation distortion of the modified directional coupler at 5% optical modulation depth (OMD) with 50% DC optical bias. For typical 40 channel cable TV applications from 50 MHz to 300 Mhz or more, −105 dBc distortion is required for two-tone test. Clearly, it can be achieved provided $\Delta n$ is less than 0.1. This requires a traveling wave electrode with very good velocity match. In order to compare the disruption of different devices, the dotted curve shows the third order intermodulation distortion for conventional Mach-Zehnder at 50% bias. FIG. 9b shows the same curves for 5% bias and 5% OMD. As indicated, the second harmonic distortion is very high. However, the −105 dBc third order distortion requirement can be met for lumped capacitance electrode on LiNbO$_3$ even up to 3 GHz. For a traveling wave electrode, third order-distortion requirement at much higher frequencies can be met with reasonable $\Delta n$, significantly reducing the complexity to make the modulators. Furthermore, even the Mach-Zehnder modulator has better than −94 dBc third order IMD. Such a Mach-Zehnder may be useful for the upper band of cable TV applications if less than 5% OMD signal can be used. This is a good illustration of the results that can be obtained from the third embodiment. The advantage of this embodiment is that it will be the simplest device to make with a low distortion.

The waveguide modulators of the present invention provide a simple design with inherently low biasing sensitivity and high fabrication tolerance in which third order inter-modulation distortion levels are more than 30 dB lower than a conventional directional coupler or Mach-Zehnder modulators at 50% bias optical modulation depth.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. An optical waveguide modulator with extended linear dynamic range for coupling a first optical channel and a second optical channel, said first optical channel and said second optical channel being carried by a first optical waveguide and a second optical waveguide, respectively, said optical waveguide modulator comprising:
    an optical coupling section for coupling said first optical channel and said second optical channel, said active coupling section having an input end and an output end, a first coupling length and a fixed amount of coupling;
    a first pair of electrodes for conducting a signal to said active coupling section;
    an RF signal source and a first bias voltage source each connected to said first pair of electrodes for providing said signal to induce a controlled mismatch in propagation constants between said first optical channel and said second optical channel;
    a first and a second passive coupling section connected to said first optical waveguide and said second optical waveguide and having a plurality of variable parameters for providing feed forward interaction with said active coupling section to compensate for nonlinearities, said first and said second passive coupling sections having a second pair of electrodes and a third pair of electrodes, respectively; and
    a second bias voltage source connected to said second pair of electrodes and a third bias voltage source connected to said third pair of electrodes for providing control of said plurality of variable parameters in response to nonlinear distortion calculated for said optical waveguide modulator.

2. An optical waveguide modulator as in claim 1 wherein said first passive coupling section comprises a fixed directional coupler to which is applied a second bias voltage from said second bias voltage source.

3. An optical waveguide modulator as in claim 1 wherein said second passive coupling section comprises a fixed directional coupler to which is applied a third bias voltage from said third bias voltage source.

4. An optical waveguide modulator as in claim 1 wherein at least one electrode of said first electrode pair is a traveling wave electrode through which an RF signal is introduced, said RF signal propagating from said input end to said output end.

5. An optical waveguide modulator as in claim 1 wherein a phase velocity of said RF signal is substantially matched to a phase velocity of an optical wave traveling within said active coupling section.

6. An optical waveguide modulator as in claim 1 further comprising a monitoring signal source connected to said first pair of electrodes for providing a continuous wave monitoring signal.

7. An optical waveguide modulator as in claim 1 further comprising a third passive coupling section having a fourth pair of electrodes and having at least one variable parameter for reduction of chirping.

8. An optical waveguide modulator as in claim 7 wherein said first passive coupling section, said second passive coupling section and said third passive coupling section each incorporate one of three parameters wherein a first parameter and a second parameter compensate for nonlinear distortion and a third parameter reduces chirping.

9. A method for improving linearity of an optical direction coupler for coupling a first optical waveguide with a second optical waveguide, the method which comprises:
    providing a directional coupler waveguide structure having two optical waveguides with a length of at least two coupling lengths;
    forming three electrode pairs over said waveguide structure;
    defining an active region with a first electrode pair being at least one coupling length long;
    defining two passive sections with a second electrode pair and a third electrode pair having a combined total length of at least one coupling length;
    applying a first bias voltage and an input RF signal to said first electrode pair to induce a mismatch in propagation constants of two optical channels being coupled, one channel corresponding to each of said first and said second optical waveguides;
    applying a second bias voltage to said second electrode pair and a third bias voltage to said third electrode pair; and
    adjusting said first bias voltage, said second bias voltage and said third bias voltage to minimize at least one of second order and third order nonlinearities introduced by said active section.

10. A method as in claim 9 wherein the step of applying a first bias voltage and an input RF signal includes applying a propagating RF signal which propagates from an input end of said first electrode pair to an output end.

11. A method as in claim 9 wherein the step of adjusting said first bias voltage further comprises adjusting said first bias voltage to obtain a low bias optical modulation depth.

12. A method as in claim 11 further comprising electrically filtering said second order nonlinearities.

13. A method as in claim 12 wherein the step of adjusting said first, second and third bias voltages includes minimizing only said third order nonlinearities.

14. A method as in claim 9 wherein the step of adjusting said first, second and third bias voltages includes maintaining a predetermined bandwidth in a fundamental signal.

15. A method as in claim 9 further comprising:
    applying a monitoring signal to said active section;
    monitoring said monitoring signal at an output of said optical directional coupler; and
    changing at least one of said first bias voltage, said second bias voltage and said third bias voltage to minimize a spurious signal within said monitoring signal.

16. A method as in claim 8 further comprising:

defining a third passive section with a fourth electrode pair; and applying a fourth bias voltage to said fourth electrode pair to reduce chirping.

17. A method for reducing third order non-linearity detected at a receiver during modulation of a fundamental signal in a Mach-Zehnder modulator having an active electrode, the method which comprises:

applying a first bias voltage to said active electrode;

observing said third order non-linearity at said receiver;

varying said first bias voltage to minimize said third order nonlinearity at a low bias optical modulation depth while maintaining a predetermined optical modulation depth of said fundamentals signal; and filtering out electrically second order nonlinearities at said receiver.

* * * * *